Oct. 26, 1926.

J. A. HOUSER 1,604,915

RECTAL LUBRICATOR AND IRRIGATOR

Filed March 12, 1924

J. A. Houser INVENTOR

BY Victor J. Evans

WITNESSES

ATTORNEY

Patented Oct. 26, 1926.

1,604,915

UNITED STATES PATENT OFFICE.

JAMES A. HOUSER, OF MARION, INDIANA.

RECTAL LUBRICATOR AND IRRIGATOR.

Application filed March 12, 1924. Serial No. 698,717.

My present invention pertains to devices for administering medical treatment through the rectum; and it has for its object to provide a rectal lubricator and irrigator which is simple and inexpensive in construction, susceptible of being expeditiously and thoroughly cleansed, and adapted to be conveniently operated to the best advantage.

To the attainment of the foregoing, the invention consists in the improvement as hereinafter described and definitely claimed.

In the accompanying drawings, forming part of this specification:—

Similar numerals of reference designate corresponding parts in all of the views of the drawings.

Figure 1:
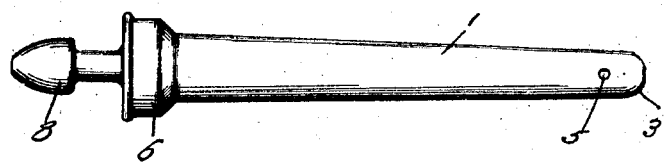
Figure 1 is a side elevation of the device constituting the preferred embodiment of my invention.

My novel device comprises an exterior member 1, and a plunger 2.

Both of the elements referred to are fabricated, preferably by molding, of appropriate plastic material susceptible of being thoroughly sterilized without injury to the material.

The exterior member 1 is tapered exteriorly and interiorly to a point adjacent to its forward end 3, and is provided with an end discharge aperture 4 and lateral discharge apertures 5, the latter adjacent to the forward end as illustrated. At its rear or heel end the member 1 is provided with a cup-shaped enlargement 6 adapted to serve as a funnel in the charging of the member with medicated substances of various descriptions, and also adapted to serve as a stop.

The plunger 2 is tapered to a point adjacent to its forward end and is provided adjacent to its rear end with a closure enlargement 7 adapted because of its taper to snugly fit and be wedged in the correspondingly shaped enlargement 6 and be held by frictional contact against casual displacement. In rear of the plug-like enlargement 7 the plunger 2 is extended and terminates in finger piece 8 for convenient manipulation thereof. At a point adjacent to its forward end the plunger 2 is provided with a circumferential groove 9 in which is seated a gasket 10, preferably of rubber, which projects slightly from the plunger in a radial direction. In the forward end of the plunger 2 is a threaded socket 11 which is designed to receive a removable plug in the form of a screw 12, the function of which is to close the bore 13 of the plunger 2 when the device is used to force medicated substance into the rectum.

Figure 2:
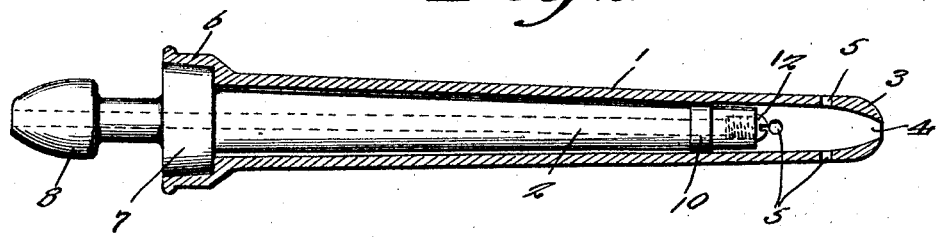
Figure 2 is a longitudinal central section of the same.
Figure 3:
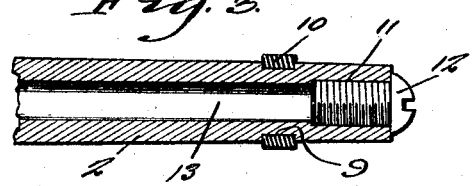
Figure 3 is an enlarged detail view of the forward end of the plunger.
Figure 4:
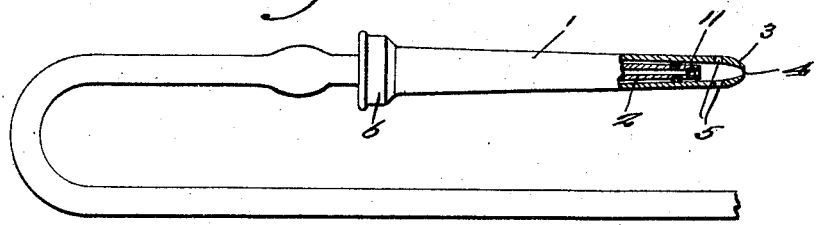
Figure 4 is a view showing the plunger with its plug removed, and the plunger connected to a syringe for irrigation purposes.

The finger piece 8 of the plunger 2 is of nipple-shape as shown, and hence is adapted to be connected detachably to a syringe tube as when it is desired to use the device for irrigation purposes, the plug 12 of the plunger being in that case removed, Figure 4, and as shown in Figures 2 and 4 the plunger is provided with a bore which the screw 12 obstructs.

It will be manifest from the foregoing that my novel device is adapted to be used to advantage as a rectal lubricator and as an irrigator, the plunger element 2 in both cases being used in the exterior member 1.

Notwithstanding the internal taper of the member 1, it will be manifest that because of the gasket 10 on the plunger 2, the said plunger 2 will serve after the manner of a follower to force substance through the apertures 4 and 5 of the member 1. From this it follows that the provision of the gasket on the plunger 2 is materially advantageous inasmuch as it renders it feasible to employ an internally and exteriorly tapered exterior member, the wall of the member 1 being of even thickness throughout which contributes to facility of manufacture, and the exterior taper of the member 1 being advantageous because it facilitates penetration of the member 1.

I have entered into a detailed description of the construction and relative arrangement of the parts embraced in the present and preferred embodiment of my invention in order to impart a full, clear and exact understanding of the said embodiment. I do not desire, however, to be understood as confining myself to the specific construction and relative arrangement of parts inasmuch as in the future practice of the invention various changes and modifications may be made such as fall within the scope of my invention as defined in my appended claim.

Having described my invention, what I claim and desire to secure by Letters-Patent, is:—

A combined lubricator and irrigator of the character described comprising a tapered tubular member provided with a plurality of openings at its small end, a plunger therefor and being longitudinally tapered to follow the taper of the tubular member, a plug-like enlargement formed on the large end of the plunger, a tapered cup shape element formed on the large end of the tubular member and adapted to receive the plug-like enlargement to snugly fit and frictionally engage the inner walls thereof, an extension formed on the plug-like enlargement, a finger piece of nipple shaped formation formed on the extension, said plunger extension and nipple being provided with a bore for irrigating purposes, a screw threaded in the bore, and a gasket received in its circumferential groove disposed adjacent the small end of the plunger to force substance through the openings for lubricating purposes.

In testimony whereof I affix my signature.

JAMES A. HOUSER.